United States Patent [19]

Boudeau et al.

[11] 4,317,951

[45] Mar. 2, 1982

[54] NIPPLED JOINT FOR FURNACE ELECTRODE

[75] Inventors: Jean-Michel Boudeau, Le Fayet; Michel Logue, Sainte-Foy-les-Lyon; Claude Parisot, Le Fayet, all of France

[73] Assignee: Societe des Electrodes et Refractaires Savoie (SERS), Paris, France

[21] Appl. No.: 198,618

[22] Filed: Oct. 20, 1980

[30] Foreign Application Priority Data

Nov. 9, 1979 [FR] France .................................. 79 28144

[51] Int. Cl.³ .............................................. H05B 7/14
[52] U.S. Cl. ...................................................... 13/18 C
[58] Field of Search ............................. 13/18 R, 18 C; 174/94 R, 94 S

[56] References Cited

U.S. PATENT DOCUMENTS 2,957,716 10/1960 Kaufmann et al. ................. 13/18 C
2,970,854 2/1961 Johnson .............................. 13/18 C
4,161,619 7/1979 Markarian ........................... 13/18 C
4,208,149 6/1980 Bowman ............................. 13/18 C Primary Examiner—Roy N. Envale, Jr.
Attorney, Agent, or Firm—Dennison, Meserole, Pollack & Scheiner

[57] ABSTRACT

A nippled joint utilizes a biconical threaded nipple, for joining the ends of graphite electrodes. This new joint involves a particular machining of the threads of each end of the nipple or of the two electrode seats into which the nipple is screwed, which allows a variable clearance to be produced along the threading, this clearance passing through a minimum value into a zone located between a tenth and a quarter of the height of the engaged threading, measured from the base of each seat. A stop system which is produced by shifting at least one thread of the nipple or of the corresponding electrode seat, allows the clearance to be distributed on both sides of the joining plane of the two electrodes. The joint finds great utility in the assembly of electrode columns in an arc furnace and allows them to endure extremely severe thermomechanical strains without breaking.

7 Claims, 3 Drawing Figures

NIPPLED JOINT FOR FURNACE ELECTRODE

The object of the present invention is a new joint which constitutes an improvement with respect to conventional joints, comprising a biconical nipple, used for assembling graphite electrodes. It is particularly suitable for graphite electrodes which are used in arc furnaces such as steel plant furnaces.

Those skilled in this art are well acquainted with the fact that the nippled joint is the weak point of an electrode column. During the course of the extremely rapid variations in temperature which the electrodes undergo in certain types of furnaces, breaks in nippled joints occur quite frequently and such breaks cause pieces of electrode to fall into the furnace. Such occurrences adversely affect the operation of the furnace. Experience has shown that the quality of the mounting of a nippled joint is very significant and that, in particular, it is necessary to attempt to distribute the clearances between the threads of the nipple and those of the seats hollowed in the two electrode ends concerned as effectively as possible. Unfortunately, in practice, this distribution is usually the result of chance. One end of the nipple is generally tightly screwed into the threaded seat with which the end of one electrode is provided, then the other end of the nipple is engaged in the threaded seat of the other electrode and, when the two electrodes are locked with respect to each other, it is established that the nipple is completely locked in the seat of the first electrode, and, on the contrary, has rather too much clearance in the seat of the second electrode.

Among the solutions which have already been suggested for resolving this problem of distributing the clearances, the solution which is the object of French Patent Application No. 1,241,362, filed on Nov. 7, 1959, is noted in particular. According to this application, in order to avoid an excessive tightening of the nipple in the electrode seat, one or more spacing members are positioned between certain threads of the nipple and the corresponding threads of the seat. These spacing member must be composed of a stable material which does not become deformed at the working temperature. According to another possibility which is also described in this patent application, instead of introducing a spacing member, it is possible to increase the thickness of one or more turns of the threading by a determined amount. This increased thickness is produced on the side of a thread of the nipple or of the seat. Experience has shown that the suggested solution, although it is a progressive measure, does not, however, generally prevent the nippled joint from breaking as a result of thermal or thermomechanical strains. Moreover, producing increased thicknesses on a surface of a thread causes difficulties from the machining point of view, which difficulties involve a considerable increase in the production costs of these nippled joints.

Detailed studies have also been carried out which show that many breaks in nippled joints are the result of two strain systems:

1. expansion strains which are generally translated by tensile stresses on the nipple along its axis and by tangential stresses which are exerted on the sides of the threaded electrode seats, and 2. mechanical strains due to conditions of use of the electrodes, which are usually exerted laterally and tend to bend the electrode column. These strains are combined with the previous strains and consequently may cause the nippled joint to break. Experiments carried out during these studies have shown that the greatest strains arose, on one hand, level with the joining plane of the electrodes, and, on the other hand, level with the base of the seat. However, the strains exerted on the walls of the seats pass through a minimum into an intermediate zone which is positioned substantially between a tenth and a quarter of the height of the seat threading engaged with the nipple, the height being measured from the base of this seat.

Therefore, means have long been sought for obtaining a variable clearance along the generatrix between the threads of the nipple and those of the electrode seat, the law of variation of this clearance being established as a function of the thermomechanical strains which are likely to develop. In order to obtain this result, it was also necessary to search for means for obtaining a symmetrical distribution of the clearance, when the nippled joint was to be mounted, on both sides of the joining plane of the nipple threads engaged in each of the two electrode seats.

In order to completely solve this problem, an initial idea was to produce a progressive variation of the clearance, on each side of the joining plane, between the threads of the nipple and those of each of the two electrode seats. This clearance is measured by the spacing between the diameter on the side, also called a primitive diameter, of the nipple threading and that of the electrode seat. The smallest clearance is preferably located at a level between a tenth and a quarter of the height of the threaded part of the seat engaging with the nipple, measured from the base, the largest clearances being produced at the two ends of the threading, i.e., at the end of small diameter and level with the joining plane. Thus, when the electrode column is influenced by transverse strains which tend to bend it, these strains are to some extent absorbed by slight transverse displacements of the ends of the nipple in the bases of the threaded seats and also level with the joining plane by slight displacements of the zone of large diameter of the nipple with respect to the upper edges of the walls of the threaded seat.

Moreover, owing to a specific machining of the threads of the nipple, or of the seat, an annular stop zone is produced in the axial direction level with one to three threads of the seat threading or with the corresponding part of the nipple, this zone preferably being located between a third and a half of the height of the threading which is engaged, measured from the end of small diameter. When the nipple is screwed into its seat, this stop zone causes the screwing action to be halted by tightening the long sides of the threads of the nipple against the long sides of the threads of the seat. It is thereby understood that the new nippled joint, which is the object of the present invention, exhibits a quite exceptional resistance to thermomechanical strains, which eliminates most of the causes of rupture during operation. Moreover, as will be seen further herein, this new nippled joint may be produced very economically without notably increasing the production costs with respect to those of conventional nippled joints.

Various embodiments of nippled joints according to the invention are possible. The following unrestricting example describes one preferred embodiment.

Figure 1:
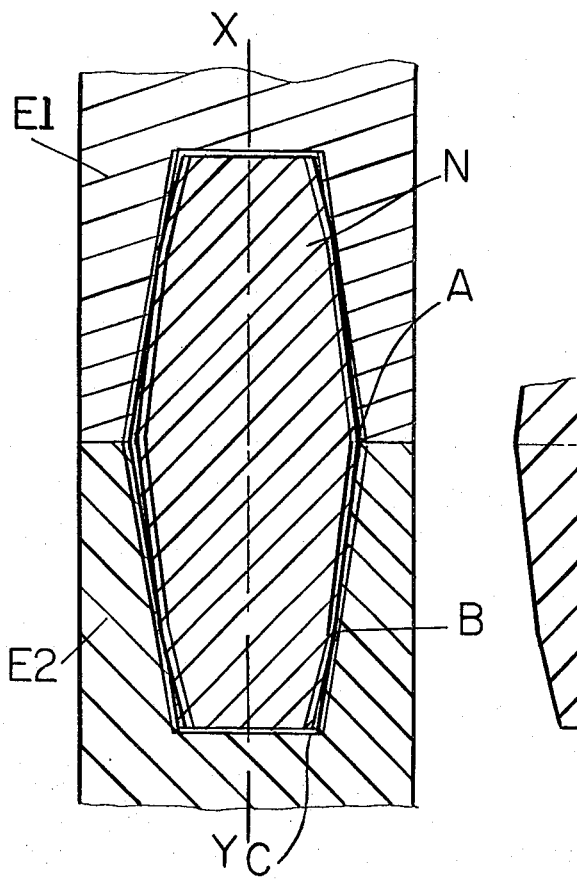
FIG. 1 is a schematic, sectional elevation of a nippled joint according to the invention.
Figure 2:
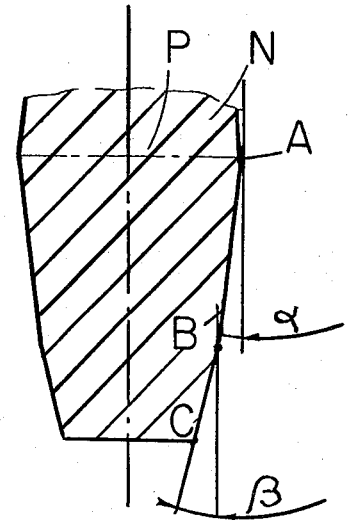
FIG. 2 is a sectional view of the lower part of the nipple of FIG. 1.

FIG. 1 represents the joint between two electrodes E1 and E2 which are 500 mm in diameter, assembled by a threaded nipple N with a spacing of four threads per inch. This nipple comprises, as usual, two parts shaped like truncated cones, facing their large base along an equatorial plane P (FIG. 2). In accordance with international norms currently used, the incline of each of the two truncated cones, expressed by the tangent of the angle of their generatrix with the axis of the nipple, is usually 1/6. In the case of the nipple according to the invention, it may be seen (FIG. 2) that this incline has two successive values. On a length AB, the generatrix of the threaded cone makes an angle $\alpha$ with the axis XY. Beyond point B, the generatrix BC makes an angle $\beta$ with the axis XY. In the present case: tg $\alpha = 0.165$; tg $\beta = 0.190$.

Thus, it is seen that the angle $\alpha$ is slightly smaller than the usual angle and angle $\beta$ is very substantially larger than the usual angle. The other part of the nipple, symmetrical with respect to the plane P is machined in identical fashion.

As far as the two electrode seats are concerned, these are theaded with the usual incline of 1/6 over the total length of the generatrix as is shown in FIG. 1.

In the case of this nipple which includes 26 threads on both sides of the equatorial plane, the length AB corresponds to 22 threads and BC corresponds to 4 threads.

It may, therefore, be seen that when this nipple is screwed into the electrode seat, the smallest clearance will be produced in zone B between the threads of the nipple and those of the seat.

Moreover, a stop zone is produced between the tenth and twelfth thread of the nipple from the end, which zone stops, with precision, the nipple from being further screwed into this seat.

In the preferred embodiment of this invention, this stop zone is obtained by shifting the tool which hollows the grooves to produce the threads, by a fraction of a mm in the direction of the end of small diameter of the nipple. Beyond this zone, the position of the tool is readjusted according to the normal fastening.

Figure 3:
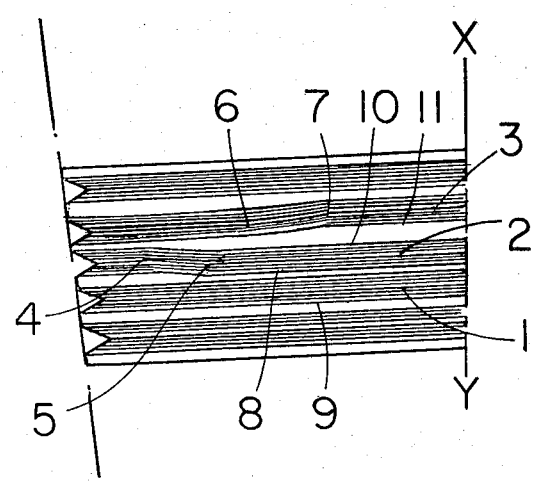
FIG. 3 is a detailed, enlarged view of some threads of the nipple of FIG. 1 in the stop zone.

FIG. 3 schematically shows a half-view of the zone, restricted by the axis XY, in which this shift is performed. It may be seen that the width of the grooves is not modified by the shift of the tool, but only the thickness of the threads themselves, surrounding the shifted groove. If it is considered that when the tool hollows the groove from the end of small diameter of the nipple, this shifted groove, marked 2, is brought slightly closer to the previous groove 1 and, thus, is slightly removed from the groove 3 which was formed after resetting the tool which caused it to make up its delay. It is observed that the shift of the tool is effected in a progressive manner over a certain length of the thread included in FIG. 3 between the points 4 and 5. Resetting is likewise effected over a length included between the points 6 and 7. These lengths depend on the speed at which these adjustments are made and on the circumferential machining velocity. In the present example, the thread 2 has been shifted by 0.12 mm, i.e., it has been drawn towards thread 1 by this value. In FIG. 3, this shift has been purposely exaggerated in order to make it clearly visual. As the width of the grooves is constant, it may be seen that a shift of this type has reduced the distance between the edges 8 and 9 of the grooves 1 and 2 by the same value. However, the result of this is an equal increase of the distance between the edges 10 and 11 of the grooves 2 and 3. The result of shifting groove 2, which is effected under the conditions which have just been described, is that the total surface of the side of the thread included between the edge 10 and the base of the groove, plays the role of a stop when the nipple is screwed into the corresponding threaded seat of the electrode. This side of the thread, which is a long side, facing the direction of the base of the seat, will halt the screwing action of the nipple before the nipple is tightened against the base of the seat and will allow a clearance to be maintained, in the cold state, between the other long thread sides of the nipple and the corresponding thread sides of the seat, in an axial direction. Contrary to what would be expected, there is no rupture in the thread which plays the role of a stop, or in that against which it rests when the joint which is thus produced is submitted to an elevated temperature. Experiments have shown that only a slight deformation of the contacting surfaces is produced. Neither is there a break in the nipple or in the sides of the electrode seat. Studies have shown in fact, that the strains which appear on a level with the stop zone are clearly smaller than those which are likely to initiate the rupture in the nipple or in the walls of the seat machined in the electrode.

Such a result is due, in particular, to a judicious choice of the stop zone which must be sufficiently removed from the joining zone and must not be too close to the point where the incline changes either. In fact, the largest transverse strains will develop at point B (see FIGS. 1 and 2) at the moment of the rise in temperature of the nippled joint, because it is at this point that the clearances are smallest. It is, therefore, preferred to position the stop zone beyond point B between a third and a half of the height of the engaged threading, measured from the ends of small diameter.

Although the value of 0.12 mm approaches the optimum, thread shifts according to the invention may be produced in an interval of between 0.08 and 0.20 mm. The operational method of the invention which has just been described, in the case of threadings comprising four threads per inch, may be transferred to the case of joints threaded at different intervals, for example, at a spacing of three threads per inch.

Whichever method is used, the thickness of the shifted threads should not be reduced so that they may support the screwing strains without breaking. One advantage of the method of shifting the groove is that not only does it not reduce the thickness of the shifted thread or threads, but that, on the contrary, it increases the thickness of the first thread. When the shift is maintained over two to three threads, only the first thread has an increased thickness. The successive threads retain the normal thickness.

Although in the preferred embodiment the smallest clearance is obtained at B where the generatrices AB and BC meet, it may be advantageous to produce an annular zone at B on the nipple, extending over a few threads and of which the generatrix is parallel to that of the seat. In this event, the incline of the nipple will have three successive values. However, in any case, the zone B must be included completely between a tenth and a quarter of the height of the engaged threading, measured from the base of the seat.

Moreover, the modifications in incline and the stop zone, which are produced on the nipple in the embodiment, may all be produced in an equally effective manner on the electrode seats, the nipple thus maintaining its normal incine and its threading without a shift.

It is also possible to distribute the modifications in incline and the shift of the threads in the stop zone between the nipple and the threaded seats. It should be noted that if the modifications in incline apply to the machining of the threaded seats, the incline of the zone which extends from the joining plane in the direction of the base of the seat must be greater than the average incline of the nipple; on the other hand, the incline of the zone which extends from the base of the seat in the direction of the joining plane must be smaller than this average incline.

The modifications in incline according to the invention which allow the clearance to be varied, may possibly also be effected, at least partially, in a continuous manner, the generatrix of the nipple or that of the threaded seat thus having, partially at least, a curvilinear form.

We claim:

1. A nippled joint for a furnace electrode, said electrode having two opposed sections with internally threaded seats, a nipple having threads on each end thereof and adapted to be received in said seats, and wherein the clearance between the threads of the nipple and the threads of the seats of the two electrode sections passes through a minimum value at a level situated in the running part of the threads between approximately a tenth and a quarter of the height of the engaged threads as measured in each seat from the base thereof.

2. A nippled joint for a furnace electrode, according to claim 1, wherein the threads of the nipple on both ends include at least two zones having inclines which are different from the average incline of the electrode seat: one zone of lesser incline which extends from the joining plane of the electrode sections in the direction of the end of the nipple and one zone of greater incline which extends from the end of the nipple in the direction of the joining plane.

3. A nippled joint according to either of claims 1 or 2, wherein on both sides of the joining plane of the electrode sections, the nipple has a zone of incline equal to that of the electrode seat included between two zones of different incline.

4. A nippled joint according to claim 2, and further including a stop zone between a third and a half of the height of the engaged theads, as measured in each electrode seat from the base thereof.

5. A nippled joint according to claim 4, wherein within the stop zone the long side of the thread of the nipple is shifted by from 0.08 to 0.20 mm in the direction of the base of the seat.

6. A nipple joint according to claim 1 wherein on both sides of the joining plane of the electrode sections the threads of each of the seats comprise at least two zones having inclines differing from the average incline of the nipple: one zone of greater incline which extends from the joining plane in the direction of the base of the seat and another zone of lesser incline which extends from the base of the seat in the direction of the joining plane.

7. A nippled joint according to claim 6 wherein the incline of the threads of the nipple or of the seat varies in a continuous manner.

* * * * *